(12) United States Patent
Massey et al.

(10) Patent No.: US 11,723,327 B2
(45) Date of Patent: Aug. 15, 2023

(54) AUTOMATED PLANT GROWING SYSTEM

(71) Applicant: Heliponix, LLC, Evansville, IN (US)

(72) Inventors: Scott Massey, Evansville, IN (US); Ivan Ball, Evansville, IN (US)

(73) Assignee: Heliponix, LLC, Evansville, IN (US)

( * ) Notice: Subject to any disclaimer, the term of this patent is extended or adjusted under 35 U.S.C. 154(b) by 118 days.

(21) Appl. No.: 17/263,073

(22) PCT Filed: Jul. 23, 2019

(86) PCT No.: PCT/US2019/043024
§ 371 (c)(1),
(2) Date: Jan. 25, 2021

(87) PCT Pub. No.: WO2020/023504
PCT Pub. Date: Jan. 30, 2020

(65) Prior Publication Data
US 2021/0307269 A1    Oct. 7, 2021

Related U.S. Application Data

(60) Provisional application No. 62/701,908, filed on Jul. 23, 2018.

(51) Int. Cl.
*A01G 31/04*        (2006.01)

(52) U.S. Cl.
CPC .................. *A01G 31/047* (2013.01)

(58) Field of Classification Search
CPC ...... A01G 31/02; A01G 31/047; A01G 31/06; A01G 9/24; A01G 9/249; A01G 9/26
See application file for complete search history.

(56) References Cited

U.S. PATENT DOCUMENTS

| 5,862,628 A * | 1/1999 | Takashima ........... A01G 31/047 47/65.8 |
| 10,314,243 B2 * | 6/2019 | Speer .................... G02B 6/0005 |

(Continued)

FOREIGN PATENT DOCUMENTS

| KR | 20160137727 A | 12/2016 |
| WO | 2016138075 A1 | 9/2016 |

(Continued)

OTHER PUBLICATIONS

International Preliminary Report on Patentability, International Searching Authority, International Application No. PCT/US2019/043024, dated Feb. 4, 2021, 14 pages.

(Continued)

*Primary Examiner* — Magdalena Topolski
*Assistant Examiner* — Katherine Anne Kloecker
(74) *Attorney, Agent, or Firm* — Taft Stettinius & Hollister LLP; William B. Gont

(57) ABSTRACT

A system for providing a growth environment for a plant positioned in an automated plant growing system is disclosed. Light sources with each light source positioned in the automated plant growing system to expose the plant to the light sources and to generate light to trigger photosynthesis in the plant. A controller that monitors a growth parameters associated with the plant to determine whether the growth parameters deviate beyond a corresponding growth threshold. Each of the growth parameters provides an indicator as to a growth status of the plant and the growth status of the plant decreases when the growth parameters deviate beyond the corresponding growth threshold. The controller automatically adjusts an environmental parameter when the growth parameters deviate beyond the growth thresholds. Each of the environmental parameters impact the growth (Continued)

Figure 1:
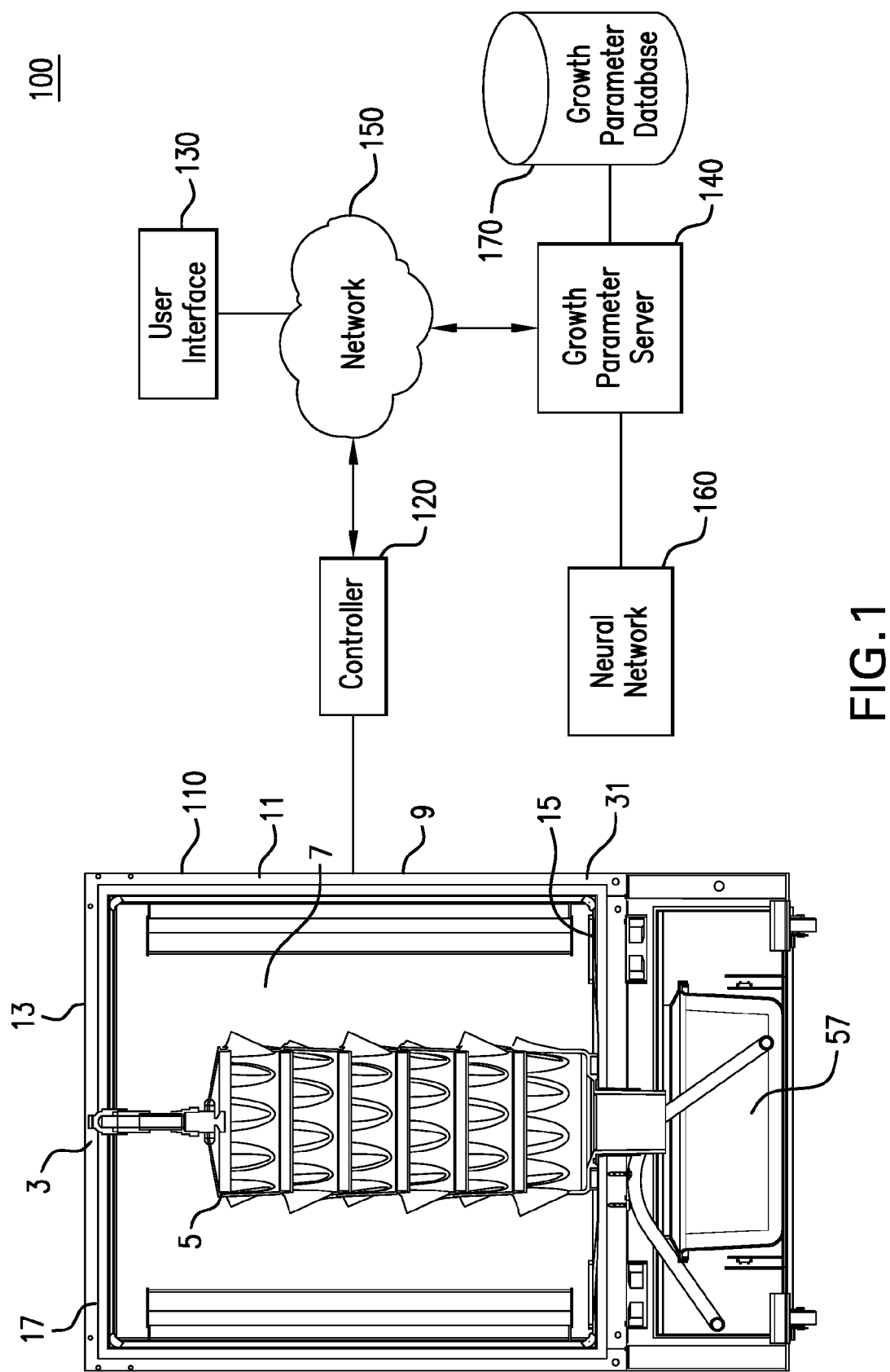

environment of the plant positioned in the automated plant growing system.

19 Claims, 2 Drawing Sheets

(56) References Cited

U.S. PATENT DOCUMENTS

| | | | |
|---|---|---|---|
| 10,499,574 B2* | 12/2019 | Lu | G08B 21/18 |
| 2007/0289207 A1 | 12/2007 | May et al. | |
| 2008/0148630 A1 | 6/2008 | Ryan et al. | |
| 2011/0061297 A1* | 3/2011 | Simmons | A01G 31/02 47/62 A |
| 2014/0115958 A1* | 5/2014 | Helene | A01G 9/24 47/17 |
| 2014/0259920 A1 | 9/2014 | Wilson | |
| 2015/0089866 A1* | 4/2015 | Abbott | H05B 47/175 315/307 |
| 2015/0351325 A1* | 12/2015 | Shelor | H05B 45/20 47/58.1 LS |
| 2016/0033943 A1 | 2/2016 | King et al. | |
| 2017/0118925 A1 | 5/2017 | Noguchi et al. | |
| 2018/0184602 A1 | 7/2018 | Ofir et al. | |
| 2019/0075741 A1* | 3/2019 | Olesen | A01G 31/06 |
| 2020/0068810 A1* | 3/2020 | Pahlevaninezhad | A01G 9/249 |

FOREIGN PATENT DOCUMENTS

| | | | |
|---|---|---|---|
| WO | WO-2016164652 A1 * | 10/2016 | A01G 31/00 |
| WO | 2018068042 A1 | 4/2018 | |

OTHER PUBLICATIONS

International Search Report, International Searching Authority, International Application No. PCT/US2019/043024, dated Oct. 11, 2019, 2 pages.

Written Opinion of the International Searching Authority, International Searching Authority, International Application No. PCT/US2019/043024, dated Oct. 11, 2019, 13 pages.

Chinese Office Action, China National Intellectual Property Administration, Chinese Application No. 2019800617587, dated Dec. 24, 2021, 13 pages.

Eurasian Office Action, Eurasian Patent Organization, Eurasian Application No. 202190292, dated Apr. 7, 2022, 2 pages.

Extended European Search Report, European Patent Office, European Application No. 19839884.4, dated Mar. 29, 2022, 8 pages.

* cited by examiner

AUTOMATED PLANT GROWING SYSTEM

CROSS-REFERENCE TO RELATED APPLICATIONS

This application claims the benefit of U.S. Provisional Application No. 62/701,908 filed on Jul. 23, 2018, which is incorporated herein by reference in its entirety.

BACKGROUND

Field of Disclosure

The present disclosure generally relates to providing a growth environment for a plant and specifically to an automated plant growing system that provides the growth environment for the plant.

Related Art

Conventional home gardening in residential areas has grown in recent years in response to food deserts limiting the availability of fresh produce in densely populated areas. Significantly more consumers request to have fresh produce and herbs grown locally to provide produce of increased freshness as well as decrease the exposure of preservatives and chemicals that are applied by grocery stores. While these conventional gardens do not require large amounts of land, the conventional gardens do require that land be allocated to the conventional gardens to adequately grow the produce. In urban areas, such land requires a premium price and is likely allocated to other uses than conventional gardens. Further, the regional climate limitations of the geographic locations of the conventional gardens further limits the type of produce items that may be grown during different seasons and may not be grown all year long.

The world human population continues to increase while worsening the ability to satisfy the global food demand. Supplies of potable of water and farm land which are both exposed to volatile weather conditions continue to become diminished worldwide as housing for the growing population is constructed resulting in the gradual increase in food prices. Conventional hydroponics systems incorporate a horizontal growth approach that has decreased yields of produce relative to the footprint of the conventional hydroponics systems that further exasperate the amount of space that the conventional hydroponics systems occupy.

Further, conventional hydroponics systems require extensive assemblies of pumps that circulate a hydroponics nutrient solution to the produce and also require an energy intensive blower to aerate the hydroponics nutrient solution with a sufficient amount of dissolved oxygen to prevent rooting of the produce. These additional conventional pumps and blowers trigger a significant increase in power consumption of the conventional hydroponics systems that significantly decreases the rate of return on investment achieved by the users of such conventional systems. Further, such conventional hydroponics systems fail to efficiently distribute water and nutrients to the produce as well as having increased maintenance costs in addition to the cost associated with the increased power consumption.

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number typically identifies the drawing in which the reference number first appears.

Figure 2:
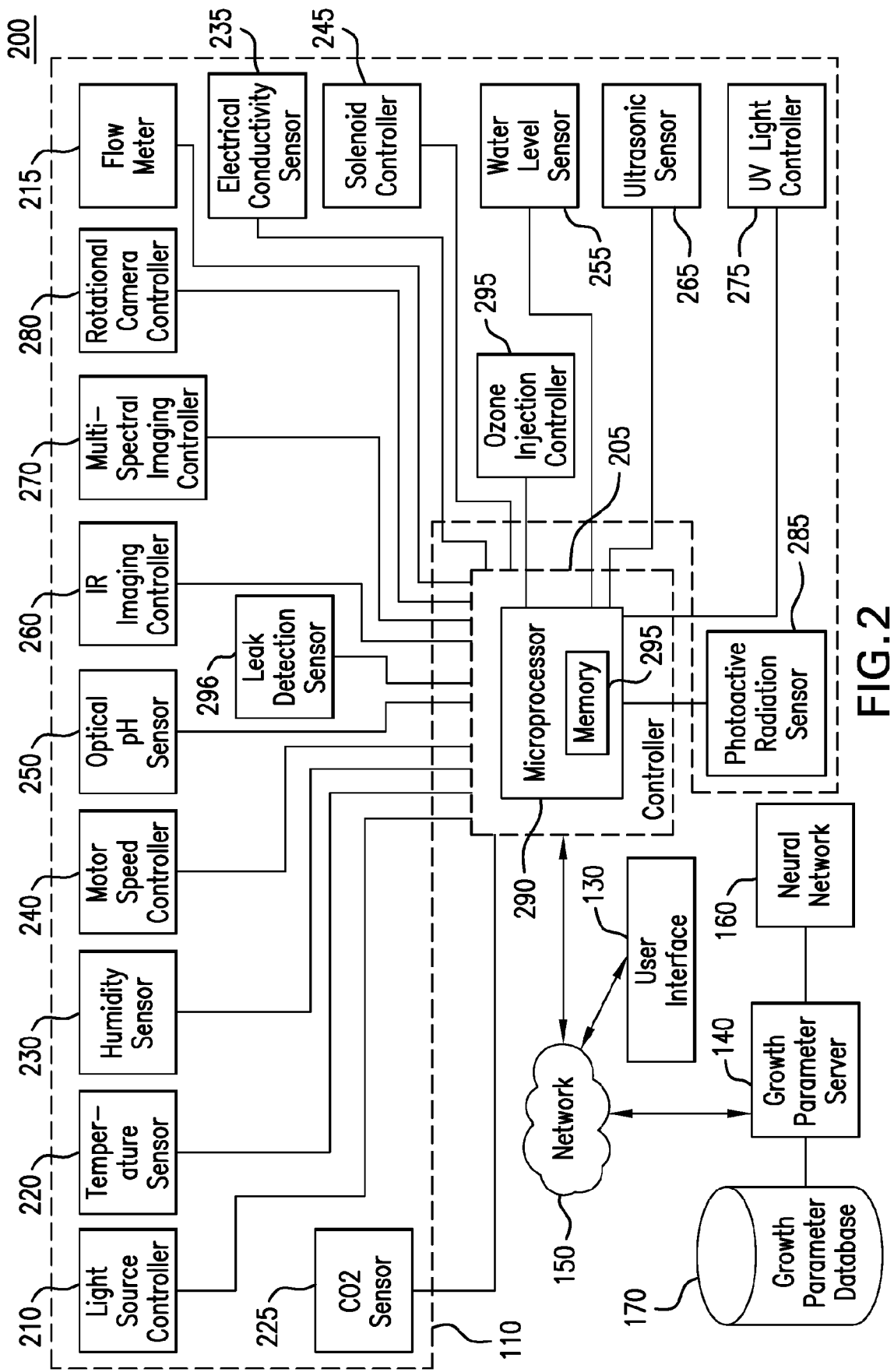

FIG. 1 illustrates a schematic view of an automated plant growing configuration that may be incorporated to assist in the growth of a plant according to an exemplary embodiment of the present disclosure; and FIG. 2 illustrates a block diagram of an automated plant growing control configuration where the controller monitors various growth parameters provided by various monitoring components included in the automated plant growing system according to an exemplary embodiment of the present disclosure.

DETAILED DESCRIPTION OF THE PRESENT DISCLOSURE

The following Detailed Description refers to accompanying drawings to illustrate exemplary embodiments consistent with the present disclosure. References in the Detailed Description to "one exemplary embodiment," an "exemplary embodiment," an "example exemplary embodiment," etc., indicate the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include read only memory ("ROM"), random access memory ("RAM"), magnetic disk storage media, solid state drive, optical storage media, flash memory devices, electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently from any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein for the purpose of description and not of limitation, such that the terminology or phraseology of the present specification is to be interpreted by those skilled in the relevant art(s) in light of the teachings herein.

SYSTEM OVERVIEW

FIG. 1 illustrates a schematic view of an automated plant growing configuration that may be incorporated to assist in the growth of a plant. The plant may be positioned in an automated plant growing system 110. The automated plant growing system 110 may provide a growth environment for the plant positioned in the automated plant growing system 110 such that the growth environment of the plant may be influenced and/or modified based on the specific needs of the plant at specific periods of time during the growth of the plant. The automated plant growing system 110 may provide the growth environment for a single plant, several plants, plants that differ from species in each other and/or any other quantity of plants and/or combination of plants that will be apparent to those skilled in the relevant art(s) without departing from the spirit and scope of the disclosure. For ease of discussion, a single plant will be referenced throughout the discussion below.

For example, the automated plant growing system 110 may include at least one light source positioned in the automated plant growing system 110 to expose the plant positioned in the automated plant growing system to the at least one light source. The at least one light source may then generate light to trigger photosynthesis in the plant. In doing so, the automated plant growing system 110 provides the growth environment for the plant that provides the plant with a source of photosynthesis that is specific to the plant housed in the automated plant growing system 110. As a result, the plant is not required to search and/or fight for a general light source such as the sun to satisfy the needs of the plant. Rather, the light intensity of the at least one light source may be adjusted based on the needs specific to the plant housed in the automated plant growing system 110 thereby providing a growth environment that is specific to the plant.

In providing a growth environment of the plant that may be influenced and/or modified based on the specific needs of the plant at specific periods of time during the growth of the plant, a controller 120 may monitor a plurality of growth parameters associated with the plant to determine whether at least one of the growth parameters deviates beyond at least one corresponding growth threshold. Each of the growth parameters provides an indicator as to a growth status of the plant and the growth status of the plant decreases when at least one of the growth parameters deviates beyond the at least one corresponding growth threshold. There may be various growth parameters specific to the plant that are to be sufficiently satisfied in order for the plant to thrive and these various growth parameters may variably change based on the plant and how the plant is responding to the growth environment provided by the automated plant growing system 110 at specific periods of time.

A growth parameter associated with the plant is a parameter that is specific to the growth of the plant and if adjusted and/or varied may have an impact on the growth of the plant. A growth status of the plant may be the status of the growth of the plant at a specified period of time. Based on the growth parameters associated with the plant at the specified period of the time, the growth status of the plant may be thriving but may also be wilting and/or maintaining. Adjustment and/or varying of the growth parameters of the plant may have a direct impact on the growth status of the plant.

For example, the typical plant requires photosynthesis to generate carbohydrates from c to continue to grow. Further, the typical plant has photosynthesis triggered when exposed to a light source. As light intensity that the plant is exposed to is adjusted and/or varied, the growth status of the plant is also impacted. The growth status of the plant is stymied when the plant is not exposed to a sufficient light intensity to trigger sufficient photosynthesis to generate sufficient carbohydrates to grow. However, there is also a maximum amount of light intensity that the plant may be exposed to before the plant suffers over exposure to the light intensity and begins to have the growth status of the plant suffer due to the over exposure to the light intensity. Thus, an optimum exposure to the light intensity of the light source of the plant is required by the plant to maintain the growth status of the plant. As a result, an example of a growth parameter of the plant is a photosynthesis growth parameter that is impacted by the light intensity that the plant is exposed to. Other examples of growth parameters of the plant may include but are not limited to temperature, humidity, pH, light absorption, electrical conductivity, $CO_2$ and/or any other type of growth parameter that impacts the growth status of the plant that will be apparent to those skilled in the relevant art(s) without departing from the spirit and scope of the disclosure.

The growth status of the plant may be negatively impacted such that the growth status of the plant decreases when a growth parameter associated with the plant deviates beyond the corresponding growth threshold for the growth parameter. The growth status of the plant may thrive when the growth parameter associated with the plant remains within the corresponding growth threshold for the growth parameter. However, the growth status of the plant may be negatively impacted when the growth parameter deviates from the corresponding growth threshold for the growth parameter. For example, the growth status of the plant may thrive when the photosynthesis growth parameter of the plant remains within the photosynthesis growth threshold. The photosynthesis growth threshold may be the threshold of light intensity that the plant may be exposed to ensure that the plant is exposed to sufficient light intensity to ensure that photosynthesis is being triggered to generate sufficient carbohydrates to grow while ensuring that the plant is not over exposed to the light intensity resulting in the growth status of the plant being negatively impacted. Other examples of growth threshold for each of the growth parameters associated with the plant may include but are not limited to temperature growth threshold, humidity growth threshold, pH growth threshold, light absorption growth threshold, nutrient uptake growth threshold, and/or any other type of growth threshold that if the corresponding growth parameter is deviated from impacts the growth status of the plant that will be apparent to those skilled in the relevant art(s) without departing from the spirit and scope of the disclosure.

The controller 120 may automatically adjust at least one environmental parameter from a plurality of environmental parameters when the at least one of the growth parameters deviate beyond the at least one of the growth thresholds. Each of the environmental parameters impact the growth environment of the plant positioned in the automated plant growing system 110. As noted above, the controller 120 may monitor each of the growth parameters to determine whether any of the growth parameters have deviated beyond the corresponding growth threshold. The controller 120 is not limited to monitoring each of the growth parameters. In addition to monitoring each of the growth parameters as well as providing a status update of each of the growth parameters as well as generating an alert when one of the growth parameters deviates from the corresponding growth threshold, the controller 120 may also automatically adjust the appropriate environmental parameters that impact the growth environment of the plant positioned in the automated plant growing system 110.

For example, the controller 120 may automatically adjust a light intensity of at least one light source positioned in the automated growing plant system 110 that the plant is exposed to when the photosynthesis growth parameter deviates beyond the photosynthesis growth threshold such that the plant is exposed to light intensity that falls below the photosynthesis growth threshold that is required for the plant to trigger sufficient photosynthesis to generate sufficient carbohydrates to grow thereby negatively impacting the growth status of the plant. In addition to monitoring the light intensity that the plant is exposed to as well as providing a status of the light intensity that the plant is exposed to as well as generating an alert that the plant is being exposed to insufficient light intensity to generate sufficient carbohydrates to grow, the controller 120 may also automatically adjust the light intensity of at least one light source such that the plant is automatically exposed to a sufficient light intensity to generate sufficient carbohydrates to grow. In doing so, the controller 120 may automatically adjust the light intensity of at least one light source such that the photosynthesis growth parameter associated with the plant increases back to within the photosynthesis growth threshold. Other examples of environmental parameters associated with the growth environment for the plant may include but are not limited to the temperature environmental parameter, humidity environmental parameter, pH environmental parameter, light absorption growth parameter, nutrient uptake growth parameter, and/or any other type of growth threshold that if the corresponding growth parameter is deviated from impacts the growth status of the plant that will be apparent to those skilled in the relevant art(s) without departing from the spirit and scope of the disclosure.

In doing so, the controller 120 may dynamically adjust each of the environmental parameters that impact the growth environment of the plant as provided by the automated plant growing system 110 to ensure that each of the growth parameters associated with the plant remain within the corresponding growth thresholds. Conventionally, the user is required to rely on their own knowledge with regard to the growth status of their plants such that the user is required to not only identify each of the growth parameters that is negatively impacting the growth status of the plant but then to also manually adjust the appropriate environmental parameters of the plant such that the growth parameters transition back to within the corresponding growth thresholds. However, any manual adjustment in the environmental parameters by the user may swing the growth parameters in the other direction so the growth parameters once again fall outside of the corresponding growth thresholds and negatively impact the growth status of the plant. For example, the user may correctly identify that the plant is to be exposed to higher light intensities to stimulate the generation of carbohydrates to grow, but the user may manually adjust the light intensities to increase the light intensities beyond the growth threshold such that the plant is then exposed to light intensities that are significantly high and cause the plant to wilt due to the increased light intensities.

Rather than have the user rely on their own knowledge with regard to the growth status of plants, the controller 120 may monitor each of the growth parameters and then dynamically adjust each of the appropriate environmental parameters to ensure that each of the growth parameters associated with the plant remain within the corresponding growth thresholds. Several growth parameters may be difficult to monitor as well as to identify the appropriate environmental parameters that are to not only be adjusted but the appropriate adjustment to ensure the growth parameters remain within the corresponding growth thresholds. Further, several growth parameters may have increased sensitivity in that the growth parameters may deviate from the corresponding growth threshold often and require increased monitoring and dynamic adjustment. The controller 120 may not only monitor the growth parameters as well as provide the status of the growth parameters as well as generate alarms when the growth parameters deviate from the corresponding growth thresholds but may also dynamically adjust the appropriate environmental parameters to ensure the growth parameters remain within the corresponding growth thresholds such that the user is not required to do so. Thus, the growth status of the plant may continue to increase and thrive thereby providing an increased performance to the user.

In an embodiment, the automated plant growing system 110 may be aeroponic system. The automated plant growing system 110 may also be a hydroponic system. The automated plant growing system 110 may also be a system that is aqua-culture, mist ponics, high pressure aeroponics, rotary aeroponics, container farm, grow box, controlled environmental agriculture (CEA), hydroculture, water culture, solution culture, soil less gardening, controlled ecological life support system, bioregenerative life support system, continuous-flow solution culture, mist nutrient solution, aerosol nutrient solution, fogponics, passive sub-irrigation, rotary hydroponics, rotary aeroponics, living appliance, growing room, organoponicos, xeriscaping, and/or any other type of plant growing system that will be apparent to those skilled in the relevant art(s) without departing from the spirit and scope of the disclosure.

The controller 120 may be a device that is capable of electronically communicating with other devices. Examples of the controller 120 may include a mobile telephone, a smartphone, a workstation, a portable computing device, other computing devices such as a laptop, or a desktop computer, cluster of computers, remote cloud service, set-top box, and/or any other suitable electronic device that will be apparent to those skilled in the relevant art(s) without departing from the spirit and scope of the disclosure.

The controller 120 may provide the user the ability to interact with the automated plant growing system 110 via the user interface 130. The controller 120 may communicate to the user via the growth status of the plant as well as the status of the growth parameters with regard to the corresponding growth thresholds via the user interface 130. In monitoring each of the growth parameters with regard to whether the growth parameters are within the corresponding growth thresholds, the controller 120 may provide the status of that monitoring to the user via the user interface 130. In an embodiment, the user may interact with the user interface 130 via the network 150 such that the controller 120 may communicate the to the user the growth status of the plant as well as the status of the growth parameters as well as the status of the monitoring of the corresponding growth thresholds by communicating such data to the user interface 130 via the network 150. The user may then engage the user interface 130 and interact with the controller 120 via the network 150. The controller 120 may also generate alarms when the growth parameters deviate from the corresponding growth thresholds to obtain the attention of the user via the user interface 130 as communicated to the user interface 130 via the network 150. The controller 120 may also communicate such alarms to the user via indicators that are positioned on the automated plant growing system, such as LEDs, that may indicate to the user the alarms that have been generated. The user may also manually engage the automated plant growing system 110 via the user interface 130. The user interface 130 may be any type of display device including but not limited to a touch screen display, a liquid crystal display (LCD) screen, RGB LEDs, a website application, and/or mobile application accessed by the user via the network 150, and/or any other type of display that will be apparent from those skilled in the relevant art(s) without departing from the spirit and scope of the present disclosure.

As the controller 120 monitors each of the growth parameters of the plant to determine whether the growth parameters deviate from the corresponding growth thresholds and as the controller 120 automatically adjusts the environmental parameters of the automated plant growing system 110, the controller 120 may stream plant data to a growth parameter server 140 that is stored in a growth parameter database 170. Plant data is any type of data that is associated with the plant as well as with the controller 120 monitoring the growth parameters of the plant as well as with the adjustments to the environmental parameters that the controller 120 may execute to ensure the growth parameters remain within the corresponding growth thresholds. Thus, the plant data is any type of data associated with the growth status of the plant that may impact the growth status of the plant whether positively and/or negatively that may be incorporated in the future by the controller 120 and/or any other controller associated with any other automated plant growing system to assist the controller 120 and/or any other controller in automatically adjusting the environmental parameters to ensure the growth parameters remain within the corresponding growth thresholds.

For example, the plant included in the automated plant growing system 110 may be a tomato plant. The controller 120 may then automatically adjust the light intensity of each light source included in the automated plant growing system 110 at varying periods of time as well as based on the rotation of the tomato plant that each portion of the tomato plant is exposed to enhance the triggering of photosynthesis to optimize the amount of carbohydrates generated by the tomato plant to ensure that the photosynthesis growth parameter remains within the photosynthesis growth threshold. The controller 120 may then stream the plant data that includes that the plant is a tomato plant as well as the magnitude of each light intensity for each period of time that the controller 120 exposed the tomato plant to as well as based on the rotation of the tomato plant such that the plant data may include the magnitude of light intensity that each portion of the tomato plant is exposed to for each period of time. The controller 120 may stream this plant data to the growth parameter server 140 and store on the growth parameter database 170.

The controller 120 as well as any other controller associated with any other automated plant growing system may continuously stream plant data to the growth parameter server 140 that is stored on the growth parameter database 170. In doing so, the growth parameter database 170 may continuously accumulate plant data that is associated automatic adjustments many different environmental parameters executed by many different controllers monitoring the growth parameters with many different plants. Over time as the plant data accumulated by the growth parameter server 140 continues to increase, the neural network 160 may then apply a neural network algorithm such as but not limited to a multilayer perceptron (MLP), a restricted Boltzmann Machine (RBM), a convolution neural network (CNN), and/or any other neural network algorithm that will be apparent to those skilled in the relevant art(s) without departing from the spirit and scope of the disclosure.

Each time that plant data is streamed to the growth parameter server 140 and stored on the growth parameter database 170, the neural network 160 may then assist the controller 120 by providing the controller 120 with the appropriate adjustments with regard to the appropriate environmental parameters to automatically adjust based on the growth parameters of the plant based on the increased amount of plant data stored in the growth parameter database 170. The neural network 160 may assist the controller 120 in learning as to the appropriate actions to execute based on the growth parameters that the plant is experiencing such that the neural network 160 may further improve the accuracy of the controller 120 in automatically adjusting the appropriate environmental parameters to further enhance the growth status of the plant in real-time. The neural network 160 may provide the controller 120 with improved upon accuracy in automatically adjusting the appropriate environmental parameters such that the neural network 160 may continue to learn upon with the accumulation of plant data that is provided by the controller 120 and/or any other controller associated with any other automated plant growing system to the growth parameter server 140. Thus, the growth status of the plant may be further enhanced with minimal efforts by the user regardless of the experience level of the user with the health of plants.

The growth parameter server 140 includes a processor, a memory, and a network interface, herein after referred to as a computing device or simply "computer". For example, the growth parameter server 140 may include a data information system, data management system, web server, and/or file transfer server. The growth parameter server 140 may also be a workstation, mobile device, computer, cluster of computers, remote cloud service, set-top box, a cloud server or other computing device. In an embodiment, multiple modules may be implemented on the same computing device. Such a computing device may include software, firmware, hardware, or a combination thereof. Software may include one or more applications on an operating system. Hardware can include, but is not limited to, a processor, memory, and/or graphical user interface display.

Wireless communication may occur via one or more networks 150 such as the internet. In some embodiments of the present disclosure, the network 150 may include one or more wide area networks (WAN) or local area networks (LAN). The network may utilize one or more network technologies such as the Ethernet, Fast Ethernet, Gigabit Ethernet, virtual private network (VPN), remote VPN access, Bluetooth, Zigbee, a variant of IEEE 802.11 standard such as Wi-Fi, and the like. Communication over the network 150 takes place using one or more network communication protocols including reliable streaming protocols such as transmission control protocol (TCP). These examples are illustrative and not intended to limit the present disclosure. Wired connection communication may occur with but is not limited to a fiber optic connection, a coaxial cable connection, a copper cable connection, and/or any other direct wired connection that will be apparent from those skilled in the relevant art(s) without departing from the spirit and scope of the present disclosure.

Automated Adjustment of Environmental Parameters

FIG. 2 illustrates a block diagram of an automated plant growing control configuration 200 where the controller 205 monitors various growth parameters provided by various monitoring components included in the automated plant growing system 110. The controller 205 may then automatically adjust various environmental parameters via the various modules included in the automated plant growing system 110 in response to the monitored growth parameters. In doing so, the controller 205 may continuously adjust the environmental parameters of the growth environment provided by the automated plant growing system 110 to ensure that the growth parameters remain within the corresponding growth thresholds such that the growth status of the plant increases. The automated plant growing control configuration 200 shares many similar features with the automated plant growing configuration 100; therefore, only the differences between the automated plant growing control configuration 200 and the automated plant growing system 100 are to be discussed in further detail.

In one embodiment of the present disclosure, one or more controllers 205 may connect to one or more modules that when commands are received by the controller 205, each modulate initiates an action associated with monitoring a growth parameter and/or adjusting an environmental parameter of the automated plant growing system 110 to maintain the growth parameters within the corresponding growth thresholds while minimizing the amount of unnecessary energy consumed by the automated plant growing system 110. The one or more modules may include a light source controller, temperature sensors, humidity sensors, motor speed controllers, pH sensors, an infrared (IR) imaging controller, a multi-spectral imaging controller, a rotational camera controller, $CO_2$ sensors, electrical conductivity sensors, and/or any other module that may monitor a growth parameter and/or adjust an environmental parameters of the automated plant growing system to increase the growth status of the plant while minimizing the amount of energy consumed by the automated plant growing system 110 that will be apparent to those skilled in the relevant art(s) without departing from the spirit and scope of the disclosure.

The controller 205 includes a microprocessor 290 and a memory 295 and may be referred to as a computing device or simply "computer". For example, the controller 205 may be workstation, mobile device, computer, cluster of computers, remote cloud service, set-top box, or other computing device. In one embodiment of the present invention, multiple modules may be implemented on the same computing device. Such a computing device may include software, firmware, hardware, or a combination thereof. Software may include one or more applications on an operating system. Hardware can include, but is not to be limited to, microprocessor 290, the memory 295, and/or the user interface 130.

The controller 205 may communicate with each of the light source controller 210, the temperature sensor 220, the humidity sensor 230, the motor speed controller 240, the pH sensor 250, the IR imaging controller 260, the multi-spectral imaging controller 270, the rotational camera controller 280 via serial communication, wireless communication and/or a wired connection. Serial communication may be executed using serial semantics, such as RS45 multi-drop serial communication. Communication may also be executed using Inter-Integrated Circuit (I2C) protocol, serial peripheral interface (SPI), and camera serial interface (CSI). However, any type of serial communication may be implemented that will be apparent from those skilled in the relevant art(s) without departing from the spirit and scope of the present disclosure.

As noted above, the controller 205 automatically adjusts a light intensity for each light source based on a photosynthesis growth parameter when the photosynthesis growth parameter deviates beyond a photosynthesis growth threshold to return the photosynthesis growth parameter to within the photosynthesis growth threshold. The growth status of the plant decreases when the photosynthesis growth parameter deviates beyond the photosynthesis growth threshold due to the light intensity emitted by each light source.

The automated plant growing system 110 may include at least one light source that may act as the primary source of light for the plant that is positioned in the automated plant growing system 110. The photosynthesis of the plant may be triggered based on the intensity of the light provided by the at least one light source such that the amount of carbohydrates generated by the plant is based on the intensity of the light provided by the at least one light source. The controller 205 may monitor the photosynthesis growth parameter to determine whether the photosynthesis growth parameter deviates from the photosynthesis growth threshold. As the photosynthesis growth parameter deviates from the photosynthesis growth threshold such that growth status of the plant is negatively impacted, the controller 205 may automatically instruct the light source controller 210 to adjust the intensity of light emitted by the at least one light source to ensure that the photosynthesis growth parameter remains within the photosynthesis growth threshold. The automated plant growing system 110 may include a single light source, two light sources, a plurality of light sources, and/or any quantity of light sources such that the controller 205 may automatically adjust the light intensity of the one or more light sources to ensure that the photosynthesis growth parameter remains within the photosynthesis growth threshold that will be apparent to those skilled in the relevant art(s) without departing from the spirit and scope of the disclosure.

Each of the light sources included in the automated plant growing system 110 may have dimming features such that the controller 205 may dynamically adjust the light intensity of each of the light sources via the light source controller 210. As the plant is positioned in the automated plant growing system 110, the controller 205 may monitor the photosynthesis growth parameter of the plant to determine whether the photosynthesis growth parameter deviates from the photosynthesis growth threshold. The controller 205 may then dynamically adjust the light intensity of each of the light sources via the light source controller 210 that may adjust the dimming of each light source from within a dimming range of 0% to 100%. The light sources included in the automated plant growing system 110 may be incandescent lights, halogen lights, fluorescent lights, light emitting diode (LED) lights, and/or any other type of light source that is adequate to trigger photosynthesis in a plant that will be apparent to those skilled in the relevant art(s) without departing from the spirit and scope of the disclosure.

Each portion of the plant may have photosynthesis growth parameters that differ from each other as the plant is positioned in the automated plant growing system 110. For example, leaves of the plant included in a first portion of the plant may have a photosynthesis growth parameter that is deviating below the photosynthesis growth threshold in that the leaves of the first portion of the plant require an increase in light intensity to trigger photosynthesis to generate sufficient carbohydrates. However, leaves of the plant included in a second portion of the plant may have a photosynthesis growth parameter that is deviating above the photosynthesis growth threshold in that the second portion of the plant requires a decrease in the light intensity to prevent the growth status of the plant from decreasing.

The controller 205 may monitor the photosynthesis growth parameters of different portions of the plant and then dynamically adjust the light intensity of different light sources to satisfy the different growth parameters of different portions of the plant. In such an example, the controller 205 may dynamically adjust the light intensity of the light sources that are exposing the first portion of the plant via the light source controller 210 such that the controller 205 may increase the light intensity of the light sources that are exposing the first portion of the plant to increase the photosynthesis growth parameter of the first portion of the plant to be within the photosynthesis growth threshold. The controller 205 may dynamically adjust the light intensity of the light sources that are exposing the second portion of the plant via the light source controller 210 such that the controller 205 may decrease the light intensity of the light sources that are exposing the second portion of the plant to decrease the photosynthesis growth parameter of the second portion of the plant to be within the photosynthesis growth threshold.

In doing so, the controller 205 may monitor the photosynthesis growth parameters of each portion of the plant and then dynamically adjust the light intensity of the corresponding light sources such that the light intensity of each of the light sources differs accordingly as required to maintain each of the different photosynthesis growth parameters within the photosynthesis growth threshold. Thus, the controller 205 may customize the light intensity that each portion of the plant is exposed to by dynamically adjusting the light intensity of each of the corresponding light sources to satisfy the photosynthesis growth parameter of each portion of the plant as that photosynthesis growth parameter deviates.

As noted above, the controller 205 as well as any other controller associated with any other automated plant growing system may stream plant data to the growth parameter server 140 that is then stored and accumulates and is implemented into the neural network 160. The plant data may include the absorption points of light for each portion of the plant as the plant is positioned in the automated plant growing system 110 as well as the photosynthesis growth parameter for each portion of the plant as well as the light intensity that each portion of the plant is exposed to via the different light sources. In addition, research information conducted with regard to the light intensity level that triggers optimum absorption points of light for each different plant may also be streamed to and stored by the growth parameter server 140.

With the accumulation of such plant data, the neural network 160 may assist the controller 205 with regard to dynamically adjusting the light intensity of each light source such that each portion of the plant receives the appropriate level of light intensity to result in optimum absorption of light. In doing so, the neural network 160 may assist the controller 205 to dynamically react to each of the different photosynthesis growth parameters for each portion of the plant and dynamically adjust the light intensity for each of the corresponding light sources to maintain each of the different photosynthesis growth parameters to be within the photosynthesis growth threshold. Thus, the controller 205 may ensure that each portion of the plant is being exposed to adequate levels of light intensity as the photosynthesis growth parameter for each portion of the plant fluctuates.

The controller 205 automatically adjusts a spectrum for each light source based on the photosynthesis growth parameter when the photosynthesis growth parameter deviates beyond the photosynthesis growth threshold to return the photosynthesis growth parameter to within the photosynthesis growth threshold. The growth status of the plant decreases when the photosynthesis growth parameter deviates beyond the photosynthesis growth threshold due to the spectrum emitted by each light source.

The automated plant growing system 110 may include at least one light source that each emit different spectrums of light. In addition to the light intensity emitted by the at least one light source, photosynthesis of the plant may also be triggered based on the spectrum of the light provided by the at least one light source such that the amount of carbohydrates generated by the plant is based on the spectrum of the light provided by the at least one light source. As the photosynthesis growth parameter deviates from the photosynthesis growth threshold such that the growth status of the plant is negatively impacted, the controller 205 may automatically instruct the light source controller 210 to adjust the spectrum of the light emitted by the at least one light source to ensure that the photosynthesis growth parameter remains within the photosynthesis growth threshold. The automated plant growing system 110 may include a single light source that may be adjusted into different spectrums, two light sources that differ in spectrums, two light sources that may be adjusted into different spectrums, and/or any quantity of light sources that differ in spectrums and/or may be adjusted into different spectrums such that the controller 205 may automatically adjust the spectrum of the one or more light sources to ensure that the photosynthesis growth parameter remains within the photosynthesis growth threshold that will be apparent to those skilled in the relevant art(s) without departing from the spirit and scope of the disclosure.

Each of the light sources included in the automated plant growing system 110 may have spectrums that may be adjusted such that the controller 205 may dynamically adjust the spectrum of each of the light sources via the light source controller 210. As the plant is positioned in the automated plant growing system 110, the controller 205 may monitor the photosynthesis growth parameter of the plant to determine whether the photosynthesis growth parameter deviates from the photosynthesis growth threshold. The controller 205 may then dynamically adjust the spectrum of each of the light sources via the light source controller 210. The light sources included in the automated plant growing system 110 may include spectrums that include but are not limited to white, red, green, blue, infrared, ultraviolet and/or any other spectrum that when the plant is exposed to may impact the growth status of the plant that will be apparent to those skilled in the relevant art(s) without departing from the spirit and scope of the disclosure.

Each portion of the plant may have photosynthesis growth parameters that differ from each other as the plant is positioned in the automated plant growing system 110. For example, leaves of the plant included in a first portion of the plant may have a photosynthesis growth parameter that is deviating below the photosynthesis growth threshold in that the leaves of the first portion of the plant require a red spectrum of light to trigger photosynthesis to generate sufficient cabohydrates. However, leaves of the plant included in a second portion of the plant may have a photosynthesis growth parameter that is deviating above the photosynthesis growth threshold in that the second portion of the plant requires a blue spectrum of light to prevent the growth status of the plant from decreasing.

The controller 205 may monitor the photosynthesis growth parameters of different portions of the plant and then dynamically adjust the spectrum of different light sources to satisfy the different growth parameters of different portions of the plant. In such an example, the controller 205 may dynamically adjust the spectrum of the light sources that are exposing the first portion of the plant via the light source controller 210 such that the controller 205 may adjust the spectrum to red light of the light sources that are exposing the first portion of the plant to increase the photosynthesis growth parameter of the first portion of the plant to be within the photosynthesis growth threshold. The controller 205 may dynamically adjust the spectrum to blue light of the light sources that are exposing the second portion of the plant via the light source controller 210 to decrease the photosynthesis growth parameter of the second portion of the plant to be within the photosynthesis growth threshold.

In doing so, the controller 205 may monitor the photosynthesis growth parameters of each portion of the plant and then dynamically adjust the spectrum of the corresponding light sources such that the light intensity of each of the light sources differs accordingly as required to maintain each of the different photosynthesis growth parameters within the photosynthesis growth threshold. Thus, the controller 205 may customize the spectrum of light that each portion of the plant is exposed to by dynamically adjusting the spectrum of each of the corresponding light sources to satisfy the photosynthesis growth parameter of each portion of the plant as that photosynthesis growth parameter deviates.

As noted above, the controller 205 as well as any other controller associated with any other automated plant growing system may stream plant data to the growth parameter server 140 that is then stored and accumulates and is implemented into the neural network 160. The plant data may include the absorption points of light for each portion of the plant as the plant is positioned in the automated plant growing system 110 as well as the photosynthesis growth parameter for each portion of the plant as well as the spectrum of light that each portion of the plant is exposed to via the different light sources. In addition, research information conducted with regard to the exposure to each spectrum of light that triggers optimum absorption points of light for each different plant may also be streamed to and stored by the growth parameter server 140.

Further, the user may provide to the controller 205 via the user interface 130 plant data that includes feedback as to the taste of the plant that the user prefers. For example, the user may decide that the taste of the lettuce positioned in the automated plant growing system 110 is at a bitter level beyond the satisfaction of the user. The user would rather prefer lettuce that includes a sweet taste rather than a bitter taste. The user may provide such plant data to the controller 205 via the user interface 130. The controller 205 may then automatically adjust the photosynthesis growth threshold such that the photosynthesis growth parameter for each portion of the lettuce results in the lettuce generating carbohydrates at a level such that the sugar content of the lettuce is adjusted to provide a sweeter taste in the lettuce rather than bitter. The controller 205 may then dynamically adjust the spectrum of each light to transition the photosynthesis growth portion of each portion of the lettuce to be within the adjusted photosynthesis threshold to result in lettuce that is sweeter in taste rather than bitter.

With the accumulation of such plant data, the neural network 160 may assist the controller 205 with regard to dynamically adjusting the spectrum of each light source such that each portion of the plant receives the appropriate spectrum of light to result in optimum absorption of light. In doing so, the neural network 160 may assist the controller 205 to dynamically react to each of the different photosynthesis growth parameters for each portion of the plant and dynamically adjust the spectrum of light for each of the corresponding light sources to maintain each of the different photosynthesis growth parameters to be within the photosynthesis growth threshold. Thus, the controller 205 may ensure that each portion of the plant is being exposed to the adequate spectrum of light as the photosynthesis growth parameter for each portion of the plant fluctuates.

In an embodiment, the controller 205 may instruct the light source controller 210 to automatically lower the light intensity of the light sources positioned in the automated plant growing system 110 when the user approaches the automated plant growing system 110 and/or opens the door of the automated plant growing system 110 to access the plant positioned in the automated plant growing system 110. In doing so, the controller 205 may ensure that the light intensity of each the light sources does not cause harm to the eyes of the user. The controller 205 may also instruct the light source controller 210 to automatically transition the light sources in the red and blue spectrums into other spectrums and/or to deactivate the light sources in the red and blue spectrums when the user approaches the automated plant growing system 110 and/or opens the door of the automated plant growing system 110 to access the plant positioned in the automated plant growing system 110. In doing so, the controller 205 may ensure that the red and blue spectrums of the light sources do not cause harm to the eyes of the user.

Returning to FIG. 1, the automated plant growing system 110 may include an enclosure housing 3 and a planting column 5. As discussed in detail above, the enclosure housing 3 may be environmentally controlled by the controller 120 to provide a growth environment that is customized such that the growth environment may be ideal for various plant varieties that may be grown in the automated plant growing system 110. The enclosure housing 3 may have an interior portion 7 and an exterior portion 9. The enclosure housing 3 may include multiple shapes in the form of including but not limited to cylindrical, triangular, pyramidal, helical, rectangular, spherical and/or any other shape will be apparent to those skilled in the relevant art(s) without departing from the spirit and scope of the disclosure. Each shape may include sidewalls 11 and a top 13 and bottom 15 to form the enclosure housing 3. In an embodiment, the enclosure housing 3 may be rectangular having six sides including the top wall 13, the bottom wall 15, and the four side walls 11. In an embodiment, the walls 11 may be coupled to the support structure 17 that may act as a skeleton for the enclosure housing 3. In an embodiment, the walls 11 may be seamlessly joined without a support structure. The wall 11 may include an access door and/or panel positioned on or one or more walls 11 of the enclosure housing 3. The access door may allow a user to open the enclosure housing 3 to remove and/or add plants for growing or harvesting.

In doing so, the controller 120 may rotate the planting column 5 such that each portion of the plant is exposed to different light intensities for each of the light sources as well as different spectrums for each of the light sources. In doing so, the controller 120 may rotate the planting column 5 such that the photosynthesis growth parameter for each portion of the plant is maintained in the photosynthesis growth threshold by exposing each portion of the plant to each of the different light intensities and different spectrums generated by each of the light sources.

Returning to FIG. 2, the controller 205 may dynamically adjust the speed of the rotation of the planting column 5 by instructing the motor speed controller 240 as to the speed of that the motor of the of the planting column 5 is to rotate the planting column 5. The controller 205 may monitor the photosynthesis growth parameter associated with each portion of the plant and then dynamically adjust the speed of the rotation of the planting column 5 accordingly via the motor speed controller 240 to ensure that the photosynthesis growth parameter associated with each portion of the plant is maintained within the photosynthesis growth threshold.

For example, the controller 205 may determine that the photosynthesis growth parameter associated with a first portion of the plant requires an increased exposure to the red spectrum while the photosynthesis growth parameter of the second portion of the plant requires an increased exposure to the white spectrum. The controller 205 may then instruct the motor speed controller 240 to dynamically adjust the speed of the rotation of the planting column 5 such that the first portion of the plant is exposed to the red spectrum for the increased exposure and that the second portion of the plant is exposed to the white spectrum for the increased exposure to ensure that the photosynthesis parameters associated with the first portion of the plant and the second portion of the plant are maintained in the photosynthesis growth threshold.

The controller 205 may determine whether each photosynthesis growth parameter of each portion of the plant deviates from the photosynthesis growth threshold based on the Daily Light Integral (DLI) for each portion of the plant. The DLI describes the quantity of photosynthetically active photons that are delivered to each portion of the plant over a 24-hour period. The DLI is a function of photosynthetic light intensity during a 24-hour duration of a day and may be expressed as moles of light per square meter per day such that the DLI measures the number of photosynthetically active photons accumulated in a square meter of each portion of the plant over the course of a 24-hour day. In doing so, the DLI provides the controller 205 with the quantity of light that each portion of the plant is exposed to over a 24-hour period.

The controller 205 may then dynamically adjust the speed of the rotation of the planting column 5 via the motor speed controller 240. As the plant is positioned in the automated plant growing system 110 and rotates, the controller may monitor the DLI for each portion of the plant and determine whether the photosynthesis parameter for each portion of the plant deviates from the photosynthesis growth threshold based on the DLI of each portion of the plant. The controller 205 may then dynamically adjust the speed of the rotation of the planting column 5 such that each portion of the plant is exposed to the appropriate light intensity emitted by each of the light sources for the appropriate amount of time to maintain the DLI of each portion of the plant to be within the photosynthesis growth threshold.

For example, a first portion of the plant may have a DLI that is significantly lower than the photosynthesis growth threshold while a second portion of the plant may have a DLI that is comfortably within the photosynthesis growth threshold. The controller 205 may then dynamically adjust the speed of the rotation of the planting column 5 via the motor speed controller 240 such that the first portion of the plant is exposed to the light sources included in the automated plant growing system 110 for an increased period of time to increase the DLI of the first portion of the plant to be within the photosynthesis growth threshold. The second portion of the plant that has a DLI that is comfortably within the photosynthesis growth threshold may then be able to be exposed to light sources that have lower light intensities for a longer period of time due to the DLI being comfortably within the photosynthesis growth threshold. Thus, the controller 205 may dynamically adjust the speed of the rotation of the planting column 5 to ensure that each portion of the plant includes a DLI that is within the photosynthesis growth threshold.

At least one temperature sensor 220 may be positioned in the automated plant growing system 110 and measures a temperature environmental parameter in real-time of the automated plant growing system 110. The temperature environmental parameter indicates a temperature of the growth environment of the plant positioned in the automated plant growing system 110. The controller 205 may automatically adjust at least one fan included in the automated plant growing system 110 to adjust in real-time the temperature environmental parameter of the automated plant growing system when a temperature growth parameter of the plant deviates beyond a temperature growth threshold to return the temperature growth parameter to within the temperature growth threshold. The growth status of the plant decreases when the temperature growth parameter deviates beyond the temperature growth threshold due to the temperature of the growth environment of the plant positioned in the automated plant growing system 110.

The controller 205 may monitor the temperature environmental parameter of the automated plant growing system 110 in real-time to ensure that the temperature of the automated plant growing system 110 is maintained within the temperature growth threshold as provided by the temperature sensor 220. Any deviation of the temperature of the automated plant growing system 110 from the temperature growth threshold may trigger the controller 205 to instruct the motor speed controller 240 to activate the fans positioned in the automated plant growing system 110 to adjust in real-time the temperature of the automated plant growing system 110 to move back within the temperature growth threshold. In doing so, the controller 205 may continuously maintain the temperature of the automated plant growing system 110 to be sufficient to the health of the plant and prevent the temperature from negatively impacting the growth status of the plant. Real-time may be the period of time when the controller 205 monitors a growth parameter and then instructs one of the modules to take action to address the growth parameter during the period of time that the controller 205 is monitoring the growth parameter.

A temperature sensor 220 may also be positioned in a base section 31 of the automated plant growing system 110 in which the enclosure 3 may be coupled and/or rested upon. The base section 31 may be a housing for various modules included in the automated plant growing system 31 such as but not limited to the water reservoir, the pump, conduits, the drive motor, and/or any other module will be apparent to those skilled in the relevant art(s) without departing from the spirit and scope of the disclosure. The controller 205 may monitor the temperature of the base section 31 via the temperature sensor 220 positioned in the base section 31 and execute actions with regard to the temperature environmental parameter of the base section 31, accordingly.

At least one humidity sensor 230 may be positioned in the automated plant growing system 110 and measures a humidity environmental parameter in real-time of the automated plant growing system 110. The humidity environmental parameter indicates a humidity of the growth environment of the plant positioned in the automated plant growing system 110. The controller 205 may automatically adjust the at least one fan included in the automated plant growing system 110 to adjust in real-time the humidity environmental parameter of the automated plant growing system 110 when a humidity growth parameter of the plant deviates beyond a humidity growth threshold to return the humidity growth parameter to within the humidity growth threshold. The growth status of the plant decreases when the humidity growth parameter deviates beyond the humidity growth threshold due to the humidity of the growth environment of the plant positioned in the automated plant growing system 110.

The controller 205 may monitor the humidity environmental parameter of the automated plant growing system 110 in real-time to ensure that the humidity of the automated plant growing system 110 is maintained within the humidity growth threshold as provided by the humidity sensor 230. Any deviation of the humidity of the automated plant growing system 110 from the humidity growth threshold may trigger the controller 205 to instruct the motor speed controller 240 to activate the fans positioned in the automated plant growing system 110 to adjust in real-time the humidity of the automated plant growing system 110 to move back within the humidity growth threshold. In doing so, the controller 205 may continuously maintain the humidity of the automated plant growing system 110 to be sufficient to the health of the plant and prevent the humidity from negatively impacting the growth status of the plant.

At least one $CO_2$ sensor may be positioned in the automated plant growing system 110 and measures $CO_2$ in real-time that is present in the automated plant growing system 110. The $CO_2$ environmental parameter may indicate a level of $CO_2$ of the growth environment of the plant positioned in the automated plant growing system 110. The controller 205 may automatically adjust other environmental parameters included in the automated plant growing system 110 to increase the growth status of the plant. The controller 205 may also automatically adjust the at least one fan included in the automated plant growing system 110 to adjust in real-time the $CO_2$ environmental parameter of the automated plant growing system 110 when a $CO_2$ growth parameter of the plant deviates beyond a $CO_2$ growth threshold to return the $CO_2$ growth parameter to within the $CO_2$ growth threshold. The growth status of the plant decreases when the $CO_2$ environmental parameter deviates beyond the $CO_2$ growth threshold due to the $CO_2$ of the growth environment of the plant positioned in the automated plant growing system 110.

The controller 205 may monitor the $CO_2$ environmental parameter of the automated plant growing system 110 in real-time to ensure that the $CO_2$ of the automated plant growing system 110 is maintained within the $CO_2$ growth threshold as provided by the $CO_2$ sensor. Any deviation of the $CO_2$ of the automated plant growing system 110 from the $CO_2$ growth threshold may trigger the controller 205 to instruct the motor speed controller 240 to activate the fans positioned in the automated plant growing system 110 to adjust in real-time the $CO_2$ of the automated plant growing system 110 to move back within the $CO_2$ growth threshold. In doing so, the controller 205 may continuously maintain the $CO_2$ of the automated plant growing system 110 to be sufficient to the health of the plant and prevent the $CO_2$ from negatively impacting the growth status of the plant.

The controller 205 may also adjust the fan speed of the fans based on the condensation that is present in the interior portion 7 of the automated plant growing system 110. Often times, the automated plant growing system 110 may be positioned in an environment where the immediate environment is extremely cool as compared to the outer environment that is extremely hot. For example, condensation present in the interior portion 7 of the automated plant growing system 110 may increase significantly when the automated plant growing system 110 is positioned in a cool environment such as a basement when the environment outside of the house is hot such as during the summer time. The controller 205 may determine from a rotational camera positioned on the automated plant growing system 110 that condensation droplets may be accumulating on the interior portion 7 of the automated plant growing system 110. The controller 205 may then instruct the fans to activate and may adjust the fan speed of the fans accordingly to remove the droplets of condensation positioned in the interior portion 7 of the automated plant growing system 110. The controller 205 may then continue to adjust the fan speed based on the amount of droplets positioned in the interior portion 7 as depicted by the rotational camera. As the amount of droplets depicted by the rotational camera decrease, the controller 205 may decrease the fan speed of the fans, accordingly. The controller 205 may then deactivate the fans when the rotational camera no longer depicts droplets of condensation positioned on the interior portion 7 of the automated plant growing system 110.

In an embodiment, the controller 205 may activate the fans to pull air up through the interior portion 7 of the automated plant growing system 110 such that the fans push air up through the light source of the automated plant growing system 110. The light source may include heat sinks such that when the drier air is pushed up through the light source by the fans, the air may flow in a convection manner and in doing so may increase the temperature and the humidity of the interior portion 7 of the automated plant growing system 110. Controller 205 may then adjust and/or activate the fans such that the fans pull the heated air out of the interior portion 7 of the automated plant growing system 110 and in doing so may cool the light source down as well as cool the interior portion 7 of the automated plant growing system 110.

In an embodiment, controller 205 may adjust the fans such that the fans pollinate the plants positioned in the interior portion 7 of the automated plant growing system 110. The controller 205 may adjust the rotation of the planting column 5 such that the planting column 5 rotates the plants to be exposed to the fans such that the plants rotate below the fans and the pollen included in the plants is blown upward in the interior portion 7 by the fans and then settles on the plants positioned in the interior portion 7 such that the plants are pollinated. In doing so, the controller 205 may automatically pollinate the plants rather than requiring a manual brushing of the plants by the user to adequately pollinate the plants.

In an embodiment, the $CO_2$ sensor may be internal and/or external to the automated plant growing system 110. A HVAC conduit may be positioned to input air into the interior portion 7 of the automated plant growing system 110 from a room external to the interior portion 7 of the automated plant growing system 110 that includes higher concentrations of $CO_2$. For example, air may be extracted from a garage, a water heater, a device that burns natural gas, an industrial fermentation process, and so on that has a higher concentration of $CO_2$ than the interior portion 7 of the automated plant growing system 110 such that the air may be extracted and input to the interior portion 7 of the automated plant growing system 110. The conduit may also be coupled to a compressed $CO_2$ canister. Baking soda ($NaHCO^3$) may also be extracted by a timed power extruder that is triggered by a $CO_2$ environmental parameter that falls below the $CO_2$ growth threshold as detected by the $CO_2$ sensor 225 to mix with vinegar ($HCH^3 COO$) on a metered dosing pump to react to levels of $CO_2$ that are within the $CO_2$ growth threshold.

The automated plant growing system 110 may include an pH sensor 250 that is positioned in the automated plant growing system 110. The pH sensor 250 may measure a pH environmental parameter in real-time of the automated plant growing system 110. The pH environmental parameter includes a pH of the growth environment of the plant positioned in the automated plant growing system 110. The controller 205 automatically adjusts the pH of the growth environment of the automated plant growing system 110 to adjust in real-time the pH environmental parameter of the automated plant growing system 110 when a pH growth parameter of the plant deviates beyond a pH growth threshold to return the pH growth parameter to within the pH growth threshold. The growth status of the plant decreases when the pH growth parameter deviates beyond the pH growth threshold due to the pH of the growth environment of the plant positioned in the automated plant growing system 110.

The pH sensor 250 may measure the nutrient content included in the water source 57. The water source 57 may be directly connected to the automated plant growing system 110 through a local water plumbed proximate to the area where the automated plant growing system 110 may be positioned. In an embodiment, the water source 57 may be a water reservoir positioned in the base 31 of the automated plant growing system 110. The water source 57 may be removable from the automated plant growing system 110 to prevent having a direct water line coupled to the automated plant growing system 110. This may enable the automated plant growing system 110 to be easily adaptable in the kitchen of the user and/or home configuration of the user without the need to plum in a water outlet. The base 31 may have a draining system to catch overflow and excess water to be recirculated and used by the irrigation system.

Plants typically require a slightly acidic water balance in order to absorb nutrients efficiently. The pH growth threshold of the water source 57 may be the threshold that the pH of the water source 57 is to be within in order to be slightly acidic to absorb nutrients efficiently. As the pH of the water source 57 deviates beyond the pH growth threshold, the ability of the plant to absorb nutrients is negatively impacted thereby negatively impacting the growth status of the plant. The controller 205 may monitor the pH of the water source 57 via the pH sensor to determine whether the pH of the water source 57 deviates beyond the pH growth threshold. Any deviation of the pH of the water source 57 from the pH growth threshold may trigger the controller 205 to automatically adjust the pH of the water source 57 to adjust in real-time the pH of the water source 57 to move back within the pH growth threshold. In doing so, the controller 205 may continuously maintain the pH of the automated plant growing system 110 to be sufficient to the health of the plant and prevent the pH from negatively impacting the growth status of the plant.

The electrical conductivity sensor 235 may measure the nutrient content of the plant included in the automated plant growing system 110. The electrical conductivity growth threshold of the plant may be the threshold that the electrical conductivity of the plant is to be within in order to for the plant to absorb nutrients efficiently. As the electrical conductivity of the plant deviates beyond the electrical conductivity growth threshold, the ability of the plant to absorb nutrients is negatively impacted thereby negatively impacting the growth status of the plant. The controller 205 may monitor the electrical conductivity of the plant via the electrical conductivity sensor 235 to determine whether the electrical conductivity of the plant deviates beyond the electrical conductivity growth threshold. Any deviation of the electrical conductivity of the plant from the electrical conductivity growth threshold may trigger the controller 205 to automatically adjust environmental parameters to adjust in real-time the electrical conductivity of the plant to move back within the electrical conductivity growth threshold. In doing so, the controller 205 may continuously maintain the electrical conductivity of the automated plant growing system 110 to be sufficient to the health of the plant and prevent the electrical conductivity from negatively impacting the growth status of the plant.

An IR imaging system may be positioned in the automated plant growing system 110 to expose the plant positioned in the automated plant growing system to the IR imaging system. The IR imaging system emits IR light to expose the plant to the IR light and to detect the IR light that is reflected back to the IR imaging system from the plant. The controller 205 determines whether each of the growth parameters is deviated beyond each of the corresponding growth thresholds based on the IR light that is reflected back to the IR imaging system from the plant.

The controller 205 may determine the photosynthesis rate of the leaves of the plant based on the IR spectrum that is emitted by the IR imaging system to determine whether different growth parameters have deviated beyond the corresponding growth thresholds. The plant grows based on the light emitted by the light sources included in the automated plant growing system 110 such that the light emitted by the light sources is within the visible spectrum. The plant may then reflect back in the IR spectrum. The controller 205 may determine whether different growth parameters have deviated from the corresponding growth thresholds based on the IR light reflected back from the plant.

The controller 205 may instruct the IR imaging controller 260 to capture IR images of the plant with a first filter and then with a second filter. Based on the differences in the IR light that reflected back from the plant with the IR images captured with the first filter and the IR images captured with the second filter, the controller 205 may determine whether different growth parameters have deviated from the corresponding growth thresholds. The controller 205 may determine whether different growth parameters have deviated from the corresponding growth threshold by calculating a Normalized Difference Vegetation Index (NDVI) of the plant based on the IR light reflected back from the plant. The controller 205 may instruct the IR imaging controller 260 to capture the IR images of the plant with a first filter and then with a second filter. Based on the pixel feedback received from the IR light reflected back from the plant with respect to the first filter and then the second filter, the controller 205 may determine the NDVI and associate the health of the plant based on a scale of −1.0 to 1.0. The controller 205 may then determine the different growth parameters that have deviated from the corresponding growth thresholds and automatically adjust the appropriate environmental parameters of the automated plant growing system 110 to transition the growth parameters back within the corresponding growth thresholds.

The controller 205 may determine whether a light absorption parameter of the plant exceeds a light absorption growth threshold. The light absorption growth parameter includes an amount of the light absorbed by the plant as emitted by the at least one light source that exceeds a light absorption growth parameter of the plant. The controller 205 may automatically deactivate the at least one light source when the light absorption growth parameter exceeds the light absorption growth threshold thereby enabling the plurality of lights to be deactivated to conserve energy consumed by the automated plant growing system 110.

The plant positioned in the automated plant growing system 110 may have a maximum amount of light energy that the plant may absorb in a 24-hour period. After the plant has absorbed the maximum amount of light energy, the plant may no longer absorb any further light energy so the light emitted by the light sources may be have minimal impact on the growth status of the plant. The plant may then emit IR light after the light absorbed by the plant has exceeded the absorption growth threshold which is the maximum amount of light that the plant may absorb in a 24-hour period. The controller 205 may instruct the IR imaging controller 260 to activate the IR imaging system to expose the plant to the IR light.

The controller 205 may monitor the plant to determine whether the plant is emitting sufficient IR light to indicate that the plant has exceeded the absorption growth threshold in that the plant may no longer absorb any additional light. In doing so, any additional light emitted by the light sources of the automated plant growing system 110 may simply have minimal impact on the growth status of the plant and may be wasting the energy consumed by the light sources. Thus, the controller 205 may instruct the light source controller 210 to deactivate the light sources when the IR light reflected by the plant indicates that the absorption growth threshold of the plant has been exceeded to thereby conserve energy that is consumed by the automated plant growing system 110.

In an embodiment, the controller 205 may adjust the light intensity of the light source by pulsing the light source controller 210 with pulse wave modulation (PWM). The controller 205 may pulse the light source controller 210 with PWM to adjust the light intensity of the light source based on the type of plant that is currently positioned in the interior portion 7 of the automated plant growing system 110. For example, the controller 205 may pulse the light source controller 210 with PWM to increase the light intensity of the light source when flowering plants are positioned in the interior portion 7 of the automated plant growing system 110. The controller may pulse the light source controller 210 with PWM to decrease the light intensity of the light source when green plants are positioned in the interior portion 7 of the automated plant growing system 110 in order to reduce the power consumption of the light source as green plants require less exposure to light than flowering plants. The controller 205 may control the light intensity of the light source via PWM, variable resistance, current regulation, voltage regulation and/or any other approach to control the light intensity of the light source that will be apparent to those skilled in the relevant art(s) without departing from the spirit and scope of the disclosure.

The controller 205 may pulse the light source controller 205 with PWM to adjust the light intensity of the light source based on the photosynthetically active radiation (PAR) of the plants positioned in the interior portion 7 of the automated plant growing system 110. The controller 205 may monitor the PAR of the plants positioned in the interior portion 7 of the automated plant growing system 110 based on the PAR detected by the photosynthetically active radiation sensor 285. The photosyncthically active radiation sensor 285 may detect the current level of PAR of the plants positioned in the interior portion 7 of the automated plant growing system 110. The controller 205 may then pulse the light source controller 205 with PWM to adjust the light intensity of the light source based on the PAR detected by the photosynthetically active radiation sensor 285. As the plants grow closer to the light source, the distance between the light source and the plants decreases thereby changing the PAR of the plants and impacting the PPFD. The PPFD is the amount of light that actually hits the plants. As the plants grow closer to the light source, there is an exponential increase in the PPFD thereby changing the PAR. The controller 205 may then pulse the light source controller 210 with PWM to adjust the light intensity, accordingly.

The controller 205 may pulse the light source controller 210 with PWM to decrease the intensity of the light source when the user opens the interior portion 7 of the automated plant growing system 110 to access the plants housed in the interior portion 7 of the automated plant growing system 110. The intensity of the light source may be significant and may be aggravating to the user when the user opens the interior portion 7 of the automated plant growing system to access the plants housed in the interior portion 7. Thus, the controller 205 may automatically pulse the light source controller 210 with PWM to decrease the intensity of the light source when the user opens the interior portion 7 of the automated plant growing system 110 to access the plants. The controller 205 may then automatically pulse the light source controller 210 with PWM to increase the intensity of the light source when the user closes the interior portion 7 of the automated plant growing system 110 as the user is no longer in a position to be aggravated by the significant light intensity of the light source.

A multi-spectral imaging system may be positioned in the automated plant growing system 110 and captures images of the plant within a spectrum range. The controller 205 may automatically determine whether a nutrient uptake growth parameter is deviated beyond a nutrient growth threshold based on the images of the plant within the spectrum range captured by the multi-spectral imaging system. The images captured of the plant within the spectrum range identify whether each nutrient required by the plant is deviated from the nutrient growth threshold.

The controller 205 may instruct the multi-spectral imaging controller 270 to capture images of the plant within specified spectrum ranges as instructed by the controller

270. The capturing of the images of the plant within specified spectrum images by the multi-spectral imaging system may enable the controller 205 to determine the plant is deficient of different nutrients that the plant requires to maintain the growth status of the plant. The capturing of the images of the plant within the spectrum images by the multi-spectral imaging system may enable the controller 205 to identify each nutrient required by the plant that is deficient. For example, the controller 205 may instruct the multi-spectral imaging controller 270 to have the multi-spectral imaging system capture images of the plant in a specified spectrum range. From the images, the controller may determine that the leaves of the plant are of yellow coloring. The controller 205 may then determine that the water stored in the water source 57 is to be replaced as there is a pH imbalance in the water supplied to the plant via the water source 57.

The controller 205 may determine the nutrients that have deviated from the nutrient uptake growth parameter which indicates that the nutrients of the plant are deficient based on the images captured by the multi-spectral imaging system in the specified spectrum range. The controller 205 may determine whether the macro nutrients to maintain the growth status of the plant of nitrogen, phosphorous, and potassium have deviated from the nutrient uptake growth parameter in that those macro nutrients are deficient from the plant based on the images captured by the multi-spectral imaging system in the specified spectrum range. The controller 205 may also identify whether the 13 to 16 micro nutrients that assist the growth status of the plant have deviated from the nutrient uptake growth parameter in that those micro nutrients are deficient from the plant based on the images captured by the multi-spectral imaging system in the specified spectrum range. In doing so, the controller 205 may identify the nutrients that are deficient for the plant and execute actions to have those nutrients supplemented to the plant such that those nutrients transition back into the nutrient growth threshold.

In an embodiment, the controller 205 may automatically generate a notification that is wirelessly communicated to the smart phone of the user indicating to the use that a specific nutrients has deviated from the nutrients growth threshold and to instruct the user as to the action to execute in replenishing the nutrients such that the nutrients transition back into the nutrients growth threshold. For example, the controller 205 may identify that the leaves of the plant have yellow coloring based on the images captured by the multi-spectral imaging system in the specified spectrum range. The controller 205 may then automatically notify the user via the smart phone of the user that a pH imbalance exists in the water source 57 and that the user should replace the water stored in the water source 57.

A rotational camera may be positioned in the automated plant growing system 110 and captures images of each portion of the plant as the plant rotates in the automated plant growing system 110 over a period of time. The rotational camera may then generate a time lapsed video that includes each of the images captured of each portion of the plant as the plant rotates in the automated plant growing system 110 of the period of time stitched together to provide the time lapsed video. The time lapsed video displays the growth status of the plant over the period of time.

As noted above, the controller 205 may instruct the motor speed controller 240 to rotate the planting column 5 such that different portions of the plant may be exposed to different light intensities emitted by the light sources. The transitioning of different portions of the plant from direct light contact for a period of time to indirect light contact for a period of time as the planting column 5 is rotated may have increased impacts on the growth status of the plant. The controller 205 may instruct the rotational camera controller 280 to have the rotational camera capture images of each portion of the plant as the plant rotates in the planting column 5 in the automated plant growing system 110 over a period of time. The controller 205 may instruct the rotational camera controller 280 to capture images of the plant at specified intervals during the period of time such that as the plant is exposed to the light sources during the period of time, the images of the plant may be stitched together to provide a time lapsed video of the plant. In doing so, the growth status of the plant over the period of time may be displayed via the time lapsed video.

The controller 205 may refrain from activating the spraying of the water in the interior portion 7 of the housing 3 when the planting column 5 is not positioned in the interior portion 7 of the housing 3. The sprayers positioned in the interior portion 7 of the housing 3 may spray significant amounts of water when activated to properly water the plants positioned in the interior portion 7 of the housing 3. However, when the planting column 5 is not positioned in the planting column 5, there are no plants and/or planting column 5 positioned in the interior portion 7 of the housing 3 to absorb the significant amounts of water sprayed by the sprayers positioned in the interior portion 7 of the housing 3. Thus, the significant amounts of water sprayed by the sprayers may cause significant damage to the automated plant growing system 110 if activated when the planting column 5 is not positioned in the interior portion 7 of the housing 3.

The controller 205 may then refrain from activating the spraying of the water in the interior portion 7 of the housing 3 when the planting column 5 is not positioned in the interior portion 7 of the housing 3 despite whether the user attempts to activate the sprayers. The controller 205 may monitor the rotational camera to determine whether the planting column 5 is positioned in the interior portion 7 of the housing 3. The controller 205 may automatically refrain from activating the spraying of the water in the interior portion 7 when the rotational camera depicts that the planting column 5 is not currently positioned in the interior portion 7 of the housing 3.

However, the planting column 5 may have different sections that may be removed from the interior portion 7 of the housing 3 without removing the other sections. For example, the user may remove a top section of the planting column 5 from the interior portion 7 of the housing 3 while having the remaining bottom sections continue to be positioned in the interior portion 7 of the housing 3. Often times, the plants remaining in the bottom sections of the planting column 5 currently positioned in the interior portion 7 of the housing 3 may block the view of the rotating camera to from properly depicting whether the top section of the planting column 5 is indeed currently positioned in the interior portion 7 of the housing 3. In such an instance, the controller 205 may not be able to properly identify whether the top section of the planting column 5 is currently positioned in the interior portion 7 of the housing 3.

In such an instance, a magnet may be positioned at the top 13 of housing 3 and may detect whether the top section of the planting column 5 is the appropriate distance from the magnet. The magnet may detect the top section of the planting column 5 when the top section of the planting column 5 is positioned in the interior portion 7 of the housing 3 due to the top section of the planting column 5 being the appropriate distance from the magnet positioned at the top 13 of housing 3. In such an instance, the controller 205 may enable the sprayers to spray the water into the interior portion 7 of the housing 3 due to the detection of the top section of the planting column 5 being positioned in the interior portion 7 of the housing 3. The controller 205 may refrain from activating the sprayers when the magnet positioned at the top 13 of the housing 13 fails to detect the top section of the planting column 5 thereby indicating that the top section of the planting column 5 is not currently positioned in the interior portion 7 of the housing 3.

A magnet may also be positioned at the bottom of the housing 3 and may detect whether the bottom section of the planting column 5 is the appropriate distance from the magnet. The magnet may detect the bottom section of the planting column 5 when the bottom section of the planting column 5 is positioned in the interior portion 7 of the housing 3 due to the bottom section of the planting column 5 being the appropriate distance from the magnet positioned at the bottom of the housing 3. In such an instance, the controller 205 may enable the sprayers to spray the water into the interior portion 7 of the housing 3 due to the detection of the bottom section of the planting column 5 being positioned in interior portion 7 of the housing. The controller 205 may refrain from activating the sprayers when the magnet positioned at the bottom of the housing 13 fails to detect the bottom section of the planting column 5 thereby indicating that the bottom section of the planting column 5 is not currently positioned in the interior portion 7 of the housing 3.

A flow meter 215 may be positioned in the automated plant growing system 110 and measure the flow rate of the water dispensed by the fluid pump. The controller 205 may determine based on the flow rate whether there are issues regarding the fluid pump and/or the seals included in the fluid pump and/or along the path that the water travels within the automated plant growing system 110. The controller 205 may also determine the amount of water that is being supplied to the plant based on the flow rate of the water measured by the flow meter 215. The controller 205 may determine the amount of water that the plant requires to maintain the growth of the plant. After the water growth threshold of the plant has been exceeded, the controller 205 may deactivate the pump such that no additional energy is expended to deliver water to the plant that is not required by the plant to increase the growth status of the plant.

A solenoid may be positioned in the base section 31. The solenoid may release water into the water source 57 when activated such that the water level stored in the water source 57 increases due to the water released by the solenoid. The solenoid may then terminate releasing water in the water source 57 when deactivated such that the water level stored in the water source 57 reaches a constant level and no longer increases. Often times the user may not be in a position to manually add water to the water source 57 when the water level of the water source 57 decreases to a water level threshold that requires the addition of water to ensure that the plants included in the automated plant growing system 110 do not suffer any distress due to the decrease in the water level of the water source 57 beyond the level that requires the addition of water. Rather than requiring that the user manually add water to the water source 57 and/or manually activate a water pump positioned in the base section 31 to add water into the water source 57, a solenoid controller 245 may automatically activate the solenoid to open the water valve release water into the water source 57 when the water level stored in the water source 57 decreases below the water level threshold. In doing so, the solenoid may automatically release water into the water source 57 based on the solenoid controller 245 without user intervention.

The controller 205 may instruct the solenoid controller 245 accordingly as to whether to activate the solenoid to open the water valve release water into the water source 57 when the water level of the water stored in the water source 57 decreases below the water level threshold thereby automating the addition of water into the water source 57. The water level threshold is the water level of the water stored in the water source 57 such that when the water level of the water source 57 decreases below the water level threshold, the health of the plants currently positioned in the automated plant growing system 110 may begin to decrease unless the water level of the water stored in the water source 57 is increased to and/or above the water level threshold. The controller 205 may then monitor the water level of the water stored in the water source 57 to determine whether the water level of the water stored in the water source 57 decreases below the water level threshold. The controller 205 may instruct the solenoid controller 245 to activate the solenoid such that the solenoid opens the water valve and releases water into the water source 57 to increase the water level of the water stored in the water source 57 to the water level threshold. The controller 205 may then instruct the solenoid controller 245 to deactivate the solenoid such that the solenoid terminates releasing water into the water source when the water stored in the water source 57 reaches and/or exceeds the water level threshold.

In an embodiment, a water level sensor 255 may be positioned in the water source 57. The water source sensor 255 may detect the water level of the water stored in the water source 57. The controller 205 may monitor the signal provided by the water level sensor 255 regarding the water level of the water stored in the water source 57. As the water level sensor 255 indicates to the controller 205 that the water level of the water stored in the water source 57 decreases below the water level threshold, the controller 205 may automatically instruct the solenoid controller 245 to activate the solenoid such that the solenoid opens the water valve and releases water into the water source 57. As the water level sensor 255 indicates to the controller 205 that the water level of the water source stored in the water source 57 reaches and/or increases above the water level threshold, the controller 205 may automatically instruct the solenoid controller 250 to deactivate the solenoid such that solenoid terminates releasing water into the water source 57.

In an embodiment, the controller 205 may monitor the flow of the water released by the solenoid when the solenoid is activated as the water flows through the filter to determine the amount of water that the solenoid has released into the water source 57. The controller 205 may then also verify the water level of the water stored in the water source 57 as detected by the water level sensor 255 to determine the volume of water that is increasing from when the controller 205 initially activated the solenoid to release the water into the water source 57. The controller 205 may then verify based on the flow of the water that is flowing through the filter as well as the increase in volume of the water detected by the water level sensor 255 as to the amount of water that has been added to the water source 57. The controller 205 may then determine whether the water level threshold of the water level of the water stored by the water source 57 has been reached and may instruct the solenoid controller 245 to activate and/or deactivate the solenoid, accordingly.

In an embodiment, the controller 205 may monitor the water level of the water stored in the water source 57 based on an ultrasonic sensor 265. The ultrasonic sensor 265 may be positioned in the base section 31 such that the ultrasonic sensor 265 may transmit an echo sound pulse towards the surface of the water stored in the water source 57. The echo sound pulse may then strike the surface of the water and in turn reflect the echo sound pulse back towards the ultrasonic sensor 265 such that the ultrasonic sensor 265 may receive the echo sound pulse. The controller 205 may then determine the duration of time that occurs between the transmission of the echo sound pulse by the ultrasonic sensor 265 and the receiving of the echo sound pulse after the echo sound pulse reflects off of the surface of the water stored in the water source 57. The controller 205 may then determine the distance of the water level of the water stored in the water source 57 from the ultrasonic sensor 265 based on the duration of time required between the transmission of the echo sound pulse by the ultrasonic sensor 265 and the receiving of the echo sound pulse after the echo sound pulse reflects off of the surface of the water.

The controller 205 may then determine whether the water level of the water stored in the water source 57 is less than the water level threshold based on the distance of the water level from the ultrasonic sensor 265. The controller 205 may then instruct the solenoid controller 245 to activate the solenoid to open the water valve and release the water when the water level of the water as determined from the ultrasonic sensor 265 is below the water threshold. The ultrasonic sensor 265 may then periodically continue to transmit the echo wave pulse as the solenoid releases the water into the water source 57. From each periodic transmission of the echo wave pulse, the controller 205 may determine the current water level of the water stored in the water source based on the duration of time that is required for each periodic echo wave pulse to be received by the ultrasonic sensor 265. As the duration of time between each echo wave pulse that is received the ultrasonic sensor 265 decreases, the controller 205 may determine that the water level of the water stored in the water source 57 continues to increase. The controller 205 may then instruct the solenoid controller 245 to have the solenoid close the water valve to terminate the release of water once the controller 205 determines that the water level of the water stored in the water source 57 has reached and/or exceeded the water level threshold based on the ultrasonic sensor 265.

The controller 205 may determine whether the water level of the water stored in the water source 57 has is below and/or has reached and/or exceeded the water level threshold based on the water level sensor 255, the ultrasonic sensor 265, the amount of water that flows through the filter, a LIDAR detector, copper strips, and/or any other type of sensor that provides the controller 205 the appropriate data to determine the water level of the water stored in the water source 57 that will be apparent to those skilled in the relevant art(s) without departing from the spirit and scope of the disclosure.

In an embodiment, a condenser may be positioned in the base section 31 to condense water from the air included in the base section 31 to generate the water to provide to the water source 57 in order to increase the water level of the water stored in the water source 57 to the water level threshold. The water condensed from the air by the condenser may already be deionized and may have a low PPM count resulting in the water being sticky for fertilizers and thereby increasing the health of the plants. In an embodiment, the condenser may include a Peltier configuration that includes thermoelectric modules. The controller 205 may activate the thermoelectric modules such that a first side has increased heat and a second side has increased cold. A temperature sensor and/or a humidity sensor may be positioned in the base section 31 and may detect the amount of humidity that has increased due to the dripping of the water into the water source 57. Based on the humidity, the controller 205 may calculate the dew point of the bases section and thereby determine the level of water stored in the water source 37 and may activate and/or deactivate the condenser, accordingly.

In doing so, water vapor may condense on the second side of increased cold and may then drip down into the water source 57 to increase the water level of the water stored in the water source 57 to the water level threshold. In another embodiment, a compressor may be positioned in the base section 31. The controller 205 may activate the compressor to execute a refrigeration cycle. In doing so, water may be generated by the compressor and may drip into the water source 57 to increase the water level of the water stored in the water source 57 to the water level threshold.

A leak detection sensor 296 may be positioned in the base section 31 such that the leak detection sensor 296 may be positioned below the fluid pump as well as the solenoid and/or condenser as well. In doing so, the leak detection sensor 296 may detect any water that may be leaking from the fluid pump and/or the water source 57 and/or the solenoid and/or condenser. The amount of water that may be dispensed by the water pump, the solenoid, the condenser, and/or leaked from the water source 57 may be significant and may cause significant damage to the residence of the user and/or any property of the user that the water may come into contact with should the water leak from the automated plant growing system 110. The controller 205 may automatically deactivate the water pump, solenoid, and/or condenser when the leak detection sensor 296 detects any water. In doing so, the controller 205 may automatically prevent the water pump, solenoid, and/or condenser from providing any further water thereby minimizing the amount water that may leak from the automated plant growing system 110. The controller 205 may also automatically notify the user that the leak detection sensor 296 has detected water via a message wirelessly communicated from the controller 205 to the communications device of the user. The controller 205 may also automatically notify the user that the leak detection sensor 296 has detected water to the supplier of the automated plant growing system 110. The controller 205 may also determine from the ultrasonic sensor 265 that the water level of the water stored in the water source 57 has continued to decrease despite water being released into the water source 57 by the solenoid and/or condenser.

The controller 205 may automatically activate the release of fertilizer packets to be released into the water stored in the water source 57 based on the amount of water that is added to the water source 57. The controller 205 may monitor the water level of the water stored in the water source 57 and may determine the amount of water that has been added to the water source 57. The controller 205 may determine when the amount of water that has been added to the water source 57 has reached a fertilization level. For example, the fertilization level may be when a gallon of water has been added to the water source 57. The controller 205 may determine that a dilution point has been reached based on when the water added to the water source 57 reaches the fertilization level thereby requiring that fertilizer be added to the water currently stored in the water source 57. The controller 205 may then automatically release one or more fertilizer packets into the water stored in the water source 57 when the fertilization level has been reached due to the water added to the water source 57. Thus, the user is not required to manually track and/or add the fertilizer packets to the water stored in the water source 57. Rather, the controller 205 automatically tracks when the fertilizer packets should be added and then automatically adds the fertilizer packets to the water source 57 when the fertilization level has been reached.

An ultraviolet (UV) light source may be positioned in the base section 31 such that the UV light source is positioned over the water stored in the water source 57. The UV light source when activated may degrade the cholesterol included in the cell walls of any bacteria that is positioned in the water thereby killing the bacteria through a non-contact method such that the UV light source does not come into contact with the water increasing the likelihood of contamination of the water. The controller 205 may instruct the UV light controller 275 to activate the UV light source such that the UV emitted by the UV light source kills the bacteria in the water stored in the water source 57.

In an embodiment, an in-line UV light source may be positioned in-line with a water pump that pumps the water stored in the water source 57 through a distribution line that transports the water from the water source 57 to the interior portion 7 of the housing 3 such that the water is then sprayed onto the plants positioned in the housing 3. In doing so, the controller 205 may instruct the UV light controller 275 to activate the UV light source that is positioned in-line with the water pump as the water pump is activate to pump the water stored in the water source 57 to the interior portion 7 of the housing to be sprayed. The UV light source may then kill the bacteria included in the water as the water travels from the water source 57 but before the water is then sprayed onto the plants positioned in the interior portion 7 of the housing thereby protecting the plants from any bacteria that is located in the water stored in the water source 57. The controller 205 may then instruct the UV light controller 275 to deactivate the UV light source when the water pump has terminated pumping the water stored in the water source 57 through the distribution line to transport the water to the interior portion 7 of the housing 3. In doing so, the controller 205 may conserve energy consumption by instructing the UV light controller 275 to deactivate the UV light source when no water is transported through the distribution line thereby eliminating any need to kill bacteria by the UV light source when the water pump is not activated and pumping water through the distribution line.

In an embodiment, silver to copper probes may be positioned in-line with the water pump and positioned in-line with the distribution line that transports water from the water source 57 to the interior portion 7 of the housing 3 such that the water is sprayed onto the plants positioned in the housing 3. In doing so, the controller 205 may activate a current that propagates through the silver to copper probes. The current propagating through the silver to copper probes may then kill the bacteria that is transported in the water that is flowing through the silver to copper probes in the distribution line as the water is pumped from the water pump up to the interior portion 7 of the housing 3 to be sprayed on the plants. In doing so, the bacteria may be removed from the water by the current flowing through the silver to copper probes before the water is sprayed onto the plants. The controller 205 may then deactivate the current propagating through the silver to copper probes when water is no longer flowing through the distribution line from the water pump to the interior portion 7 of the housing 3 to be sprayed onto the plants positioned in the housing 3.

In an embodiment, the controller 205 may instruct an ozone injection controller 295 to inject dosages of ozone into the water stored in the water source 57 in order to kill bacteria that is in the water stored in the water source 57. A canister of ozone may be coupled to the distribution line such that the controller 205 may instruct the ozone injection controller 295 to inject dosages of ozone into the water as the water flows through the distribution line from the water source 57 to the interior portion 7 of the housing 3 to be sprayed on the plants. In doing so, the dosages of ozone may kill the bacteria included in the water as the water flows through the distribution line but before the water reaches the interior portion 7 of the housing 3 to be sprayed on the plants thereby killing the bacteria before the bacteria has an opportunity to reach the plants. In an embodiment, the controller 205 may activate an in-line laser that is positioned in-line with the distribution line. As the water flows through the distribution line, the controller 205 may activate the laser and the laser beam may then kill the bacteria included in the water as the water flows from the water source 57 through the distribution line to the interior portion 7 of the housing 3 before the water is sprayed on the plants.

Each of the pods that may be inserted into the growth column 5 may have a QR code associated with the pod. After the user inserts the pod into the growth column 5, the user may scan the QR code associated with the pod via the communications device of the user. The controller 205 may then identify the particular pod that has been inserted into the growth column 5. The controller 205 may then obtain the growth parameter and environmental parameters associated with the pod and may then automatically adjust the numerous environmental parameters to ensure that the growth parameters associated with the pod are within the corresponding growth parameter thresholds. In doing so, the controller 205 may automatically customize and adjust the environmental parameters for each pod currently positioned in the growth column 5 based on the QR code associated with each pod that is positioned in the growth column 5.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirt and scope of the present disclosure. Thus the present disclosure should not be limited by any of the above-described exemplary embodiments, but should be defined only in accordance with the following claims and their equivalents.

What is claimed is:

1. A system for providing a growth environment for a plant positioned in an automated plant growing system, comprising:

at least one light source with the at least one light source positioned in the automated plant growing system to expose the plant positioned in the automated plant growing system to the at least one light source and configured to generate light to trigger photosynthesis in the plant; and a controller configured to:
monitor a plurality of growth parameters associated with the plant to determine whether at least one of the growth parameters deviate beyond at least one corresponding growth threshold, wherein each of the growth parameters provides an indicator as to a growth status of the plant and the growth status of the plant decreases when at least one of the growth parameters deviates beyond the at least one corresponding growth threshold, and automatically adjust at least one environmental parameter from a plurality of environmental parameters when the at least one of the growth parameters deviate beyond the at least one of the growth thresholds, wherein each of the environmental parameters impact the growth environment of the plant positioned in the automated plant growing system, automatically adjust a light intensity for each light source based on a photosynthesis growth parameter when the photosynthesis growth parameter deviates beyond a photosynthesis growth threshold to return the photosynthesis growth parameter to within the photosynthesis growth threshold, wherein the growth status of the plant decreases when the photosynthesis growth parameter deviates beyond the photosynthesis growth threshold due to the light intensity emitted by each light source, and automatically adjust a speed of rotation of a planting column included in the automated plant growing system when a Daily Light Integral (DLI) associated with the plant deviates beyond the photosynthesis growth threshold to return the photosynthesis growth parameter to within the photosynthesis growth threshold.

2. The system of claim 1, wherein the controller is further configured to:
automatically adjust a spectrum for each light source based on the photosynthesis growth parameter when the photosynthesis growth parameter deviates beyond the photosynthesis growth threshold to return the photosynthesis growth parameter to within the photosynthesis growth threshold, wherein the growth status of the plant decreases when the photosynthesis growth parameter deviates beyond the photosynthesis growth threshold due to the spectrum emitted by each light source.

3. The system of claim 1, wherein the controller is further configured to:
automatically adjust the pH of the growth environment of the automated plant growing system to adjust in real-time the pH environmental parameter of the automated plant growing system when a pH growth parameter of the plant deviates beyond a pH growth threshold to return the pH growth parameter to within the pH growth threshold, wherein the growth status of the plant decreases when the pH growth parameter deviates beyond the pH growth threshold due to the pH of the growth environment of the plant positioned in the automated plant growing system.

4. The system of claim 1, further comprising:
a $CO_2$ sensor configured to measure a $CO_2$ environmental parameter in real-time of the automated plant growing system, wherein the $CO_2$ environmental parameter includes a $CO_2$ of the growth environment of the plant positioned in the automated plant growing system.

5. The system of claim 1, further comprising:
an infrared (IR) imaging system positioned in the automated plant growing system to expose the plant positioned in the automated plant growing system to the IR imaging system and configured to emit IR light to expose the plant to the IR light and to detect the IR light that is reflected back to the IR imaging system from the plant.

6. The system of claim 5, wherein the controller is further configured to determine whether each of the growth parameters is deviated beyond each of the corresponding growth threshold based on the IR light that is reflected back to the IR imaging system from the at least-ene plant.

7. The system of claim 6, wherein the controller is further configured to:
determine whether a light absorption growth parameter of the plant exceeds a light absorption growth threshold, wherein the light absorption growth parameter includes an amount of the light absorbed by the plant as emitted by the at least one light source that exceeds a light absorption growth parameter of the plant; and automatically deactivate the at least one light source when the light absorption growth parameter exceeds the light absorption growth threshold, wherein the amount of light required to be absorbed by the plant is satisfied when the light absorption growth parameter exceeds the light absorption growth threshold thereby enabling the plurality of lights to be deactivated to conserve energy consumed by the automated plant growing system.

8. The system of claim 1, further comprising:
a multi-spectral imaging system positioned in the automated plant growing system and configured to capture images of the plant within a spectrum range.

9. The system of claim 8, wherein the controller is further configured to:
automatically determine whether a nutrient uptake growth parameter is deviated beyond a nutrient growth threshold based on the images of the at least one plant within the spectrum range captured by the multi-spectral imaging system, wherein the images captured of the plant within the spectrum range identify whether each nutrient required by the plant is deviated from the nutrient growth threshold.

10. The system of claim 9, further comprising:
a rotational camera positioned in the automated plant growing system and configured to:
capture images of each portion of the plant as the plant rotates in the automated plant growing system over a period of time, and generate a time lapsed video that includes each of the images captured of each portion of the plant as the plant rotates in the automated plant growing system of the period of time stitched together to provide the time lapsed video, wherein the time lapsed video displays the growth status of the plant over the period of time.

11. A method for providing a growth environment for a plant positioned in an automated growing system, comprising:
generating light to trigger photosynthesis in the plant by at least one light source with the at least one light source positioned in the automated plant growing system to expose the plant in the automated plant growing system to the at least one light source;

monitoring a plurality of growth parameters associated with the plant to determine whether at least one of the growth parameters deviate beyond at least one corresponding growth threshold, wherein each of the growth parameters provides an indicator as to a growth status of the plant and the growth status of the plant decreases when at least one of the growth parameters deviates beyond the at least one corresponding growth threshold;

automatically adjusting at least one environmental parameter from a plurality of environmental parameters when the at least one of the growth parameters deviate beyond the at least one of the growth thresholds, wherein each of the environmental parameters impact the growth environment of the plant positioned in the automated plant growing system;

automatically adjusting a spectrum for each light source based on the photosynthesis growth parameter when the photosynthesis growth parameter deviates beyond the photosynthesis growth threshold to return the photosynthesis growth parameter to within the photosynthesis growth threshold, wherein the growth status of the plant decreases when the photosynthesis growth parameter deviates beyond the photosynthesis growth threshold due to the spectrum emitted by each light source; and automatically adjusting a speed of rotation of a planting column included in the automated plant growing device when a Daily Light Integral (DLI) associated with the plant deviates beyond the photosynthesis growth threshold to return the photosynthesis growth parameter to within the photosynthesis growth threshold.

12. The method of claim 11, further comprising:
automatically adjusting the pH of the growth environment of the automated plant growing system to adjust in real-time the pH environmental parameter of the automated plant growing system when a pH growth parameter of the plant deviates beyond a pH growth threshold to return the pH growth parameter to within the pH growth threshold, wherein the growth status of the plant decreases when the pH growth parameter deviates beyond the pH growth threshold due to the pH of the growth environment of the plant positioned in the automated plant growing system.

13. The automated plant growing system of claim 12, further comprising:
measuring, by a $CO_2$ sensor, a $CO_2$ environmental parameter in real-time of the automated plant growing system, wherein the $CO_2$ environmental parameter includes a $CO_2$ of the growth environment of the plant positioned in the automated plant growing system.

14. The method of claim 13, further comprising:
emitting infrared (IR) light to expose the plant to the IR light by an IR imaging system positioned in the automated plant growing system to expose the plant positioned in the automated plant growing system to the IR imaging system; and
detecting the IR light that is reflected back to the IR imaging system from the plant.

15. The method of claim 14, further comprising:
determining whether each of the growth parameters is deviated beyond each of the corresponding growth thresholds based on the IR light that is reflected back to the IR imaging system from the plant.

16. The method of claim 15, further comprising:
determining whether a light absorption growth parameter of the plant exceeds a light absorption growth threshold, wherein the light absorption growth parameter includes an amount of light absorbed by the plant as emitted by the at least one light source exceeds a light absorption growth parameter of the plant; and
automatically deactivate the plurality of lights when the light absorption growth parameter exceeds the light absorption growth threshold, wherein the amount of light required to be absorbed by the plant is satisfied when the light absorption growth parameter exceeds the light absorption growth threshold thereby enabling the plurality of lights to be deactivated to conserve energy consumed by the automated plant growing system.

17. The method of claim 16, further comprising:
capturing images of the plant within a spectrum range by a multi-spectral imaging system positioned in the automated plant growing system.

18. The method of claim 17, further comprising:
automatically determining whether a nutrient uptake growth parameter is deviated beyond a nutrient growth threshold based on the images of the plant within the spectrum range captured by the multi-spectral imaging system, wherein the images captured of the plant within the spectrum range identify whether each nutrient required by the plant is deviated from the nutrient growth threshold.

19. The method of claim 18, further comprising:
capturing images of each portion of the plant as the plant rotates in the automated plant growing system over a period of time by a rotational camera positioned in the automated plant growing system; and
generating a time lapsed video that includes each of the images captured of each portion of the plant as the plant rotates in the automated plant growing system for the period of time that are stitched together to provide the time lapsed video, wherein the time lapsed video displays the growth status of the plant over the period of time.

* * * * *